3,305,890
INJECTION BLOW MOLDING MACHINE
Henry Senior and Frederick A. Howlett, Leicester, England, assignors to Bakelite Xylonite Limited, London, England, a British company
Filed July 25, 1961, Ser. No. 126,592
Claims priority, application Great Britain, July 28, 1960, 26,288/60
12 Claims. (Cl. 18—5)

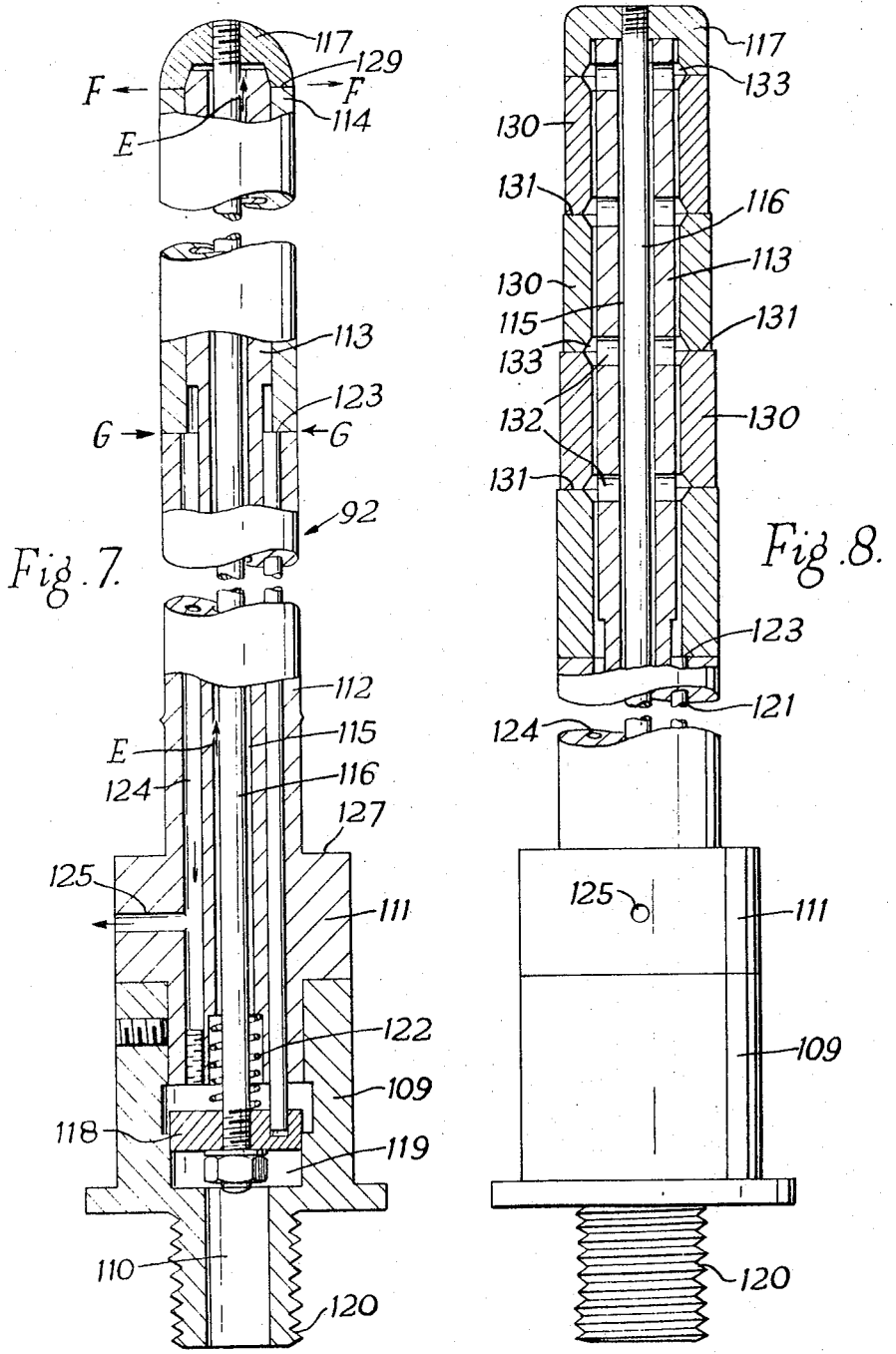

The invention relates to a machine comprising a unidirectionally rotatable structure supporting blow-moulding means, an injection moulding die assembly positioned adjacent said rotatable structure, and means for transferring a blowing mandrel, carrying a parison, from said injection moulding assembly into moulding means on said rotatable structure for blowing to shape and for travel with the moulding means.

It is preferred to have at any one time a plurality of parisons present on the moulding structure so that these can follow one another at an ejection station. For this reason the rotary structure will very conveniently comprise a table or platen which is rotatable about a vertical or horizontal axis and has mould sets spaced around it.

Further, the means for transferring the or each parison from the injection zone to the rotary structure can take various forms, but in a preferred arrangement these means comprise a mandrel carrier which is permanently associated with said structure in the sense that, whilst it can be reciprocated between the latter and the injection zone carrying a mandrel with it, nevertheless it will participate in the rotary motion of the blow-moulding structure to convey the expanded parison to the ejection station.

In the preferred case of a rotary table or platen with a ring of mould sets there will then be a mandrel carrier corresponding to each set and this will be permanently mounted on the table or platen and arranged, on reaching the station of the latter opposite the injection assembly, to move out into the latter for injection of a parison around the mandrel thereof, and then back to convey the mandrel and parison to the blowing system and through the various stations to ejection.

The form of travel of the carrier in transferring from the injection zone to the blowing system will vary with such factors as the form of the injection assembly, the disposition of the blowing mould(s), and the axis of rotation of the latter. However, in one advantageous arrangement, applied to a blowing table rotatable about a vertical axis, the carrier is slidable, when opposite the injection zone, radially on the table between an outer end position in which it extends beyond the table into the adjacent injection assembly, and an inner end position on the table which it continues to occupy during the rotation of the table until it reaches the ejection zone.

It will be understood, too, that the mould sets, both in the case of the injection assembly and of the blowing set(s), can be of various designs. They will preferably be of split form so that they can be opened to admit the mandrel(s), then closed and locked, and subsequently opened to release the mandrel(s) or for ejection of the moulded article from the latter—as the case may be. The mould parts may for example close together horizontally or vertical, rectilinearly or arcuately, one may close and the other remain stationary, and so on.

Again, whilst it has been implied in the foregoing that each mould set, injection and blowing, is dedicated to the production of one parison or one moulded article only, it will be appreciated that this is not the sole intention and that multi-impression moulds can be used with advantage in performing this invention and that, in this event, the carrier will be equipped with a corresponding number of mandrels. In fact, in an advantageous form described in detail below, the carrier is equipped so that it can be employed at any time with a selected number of mandrels, thereby making it applicable to changes in moulds.

Moreover, in accordance with an advantageous feature of this invention, the opening and closing of the moulds is accomplished by air cylinders which, in the interests of automaticity of the machine, are governed by electromagnetically operated, shutter-type, air valves. The air for operating these valves and cylinders, which will be rotatable on the blowing structure with the respective blowing mould sets, is supplied through a column or shaft forming the central rotary core of the structure.

Similarly the blowing air may also be supplied through this column or shaft, through a separate system, and an arrangement has been devised in which mould-coolant is also supplied through this central column or shaft. This affords a very compact, simple, and readily serviced system needing a minimum of equipment.

Various forms of injector assembly can successfully be used in carrying the present invention into practice. The disposition of this assembly will, naturally, depend on the form and lay-out of the blowing structure. Where, however, the latter comprises a horizontal mould-carrying table with a radially sliding carrier, supporting one or more upright mandrels, associated with each blowing mould set, the injection assembly will best be disposed alongside this table and have a mould set of which the component parts are relatively movable horizontally. The head or barrel of the injector can move in, to make the injection stroke, in any convenient direction, e.g. vertically, horizontally, or with an angular swing.

Again, although reference has been made to one injection station only around the circular blowing structure traverse, it is to be understood that there might be more than one such injection station and injection assembly—with provision for an adequate length of travel of each filled blowing mould set before ejection.

Similarly there will be at least one ejection station which will preferably be arranged shortly in advance of the injection station, and which will be equipped to remove the final blow-moulded article from each mould set in turn. For the latter purpose, compressed air or gas used to expand the parisons from the interior can be exploited at the ejection station to expel the formed articles from their blow-moulding sets.

The present invention also includes novel forms of mandrel so devised that, whilst serving as an internal former or core during the injection moulding operation, they facilitate the maintenance of the injection moulded shape of a part of the parison (e.g. a screw-threaded neck) even during the blow moulding operation.

With this in view, the mandrel has a hollow interior for connection, at the blowing stage, to the source of compressed air or gas but has an outer sleeve which is separable, along a transverse joint near the part of the mandrel at which the injected shape is to be conserved, and which can be parted at this joint during the blowing phase to allow the return flow of the blowing air back through the mandrel interior. This assists the maintenance of a lower temperature at the said part of the parison, which is not to be expanded.

A more detailed description of a method, also falling within this invention, for accomplishing the required delicate control of the screw-threaded neck of a bottle will be given below. This description will also delve more thoroughly into an advantageous mandrel construction and the fitting thereof to a sliding carrier on the blowing table.

One form of moulding machine in accordance with the present invention will now be described by way of example with reference to the accompanying drawings, in which:

FIGURE 1 is an elevational view of the general assembly of this machine,

FIGURE 2 is a vertical cross section through the central portion of the blowing turret structure of the machine, FIGURE 3 is a view taken on the line III—III of FIGURE 1, FIGURE 4 is a cross section on the line IV—IV of FIGURE 6 showing a blow moulding set positioned adjacent the injection moulding die set, with the mandrels on a carrier arranged in the latter, FIGURE 5 is an elevational view of the injection moulding die set closed, as seen on the line V—V of FIGURE 4.

FIGURE 7 illustrates a form of blowing mandrel, assumed to be used in the preceding figures, and FIGURE 8 is a view, in partial cross section, of a modified form of mandrel.

Figure 1:
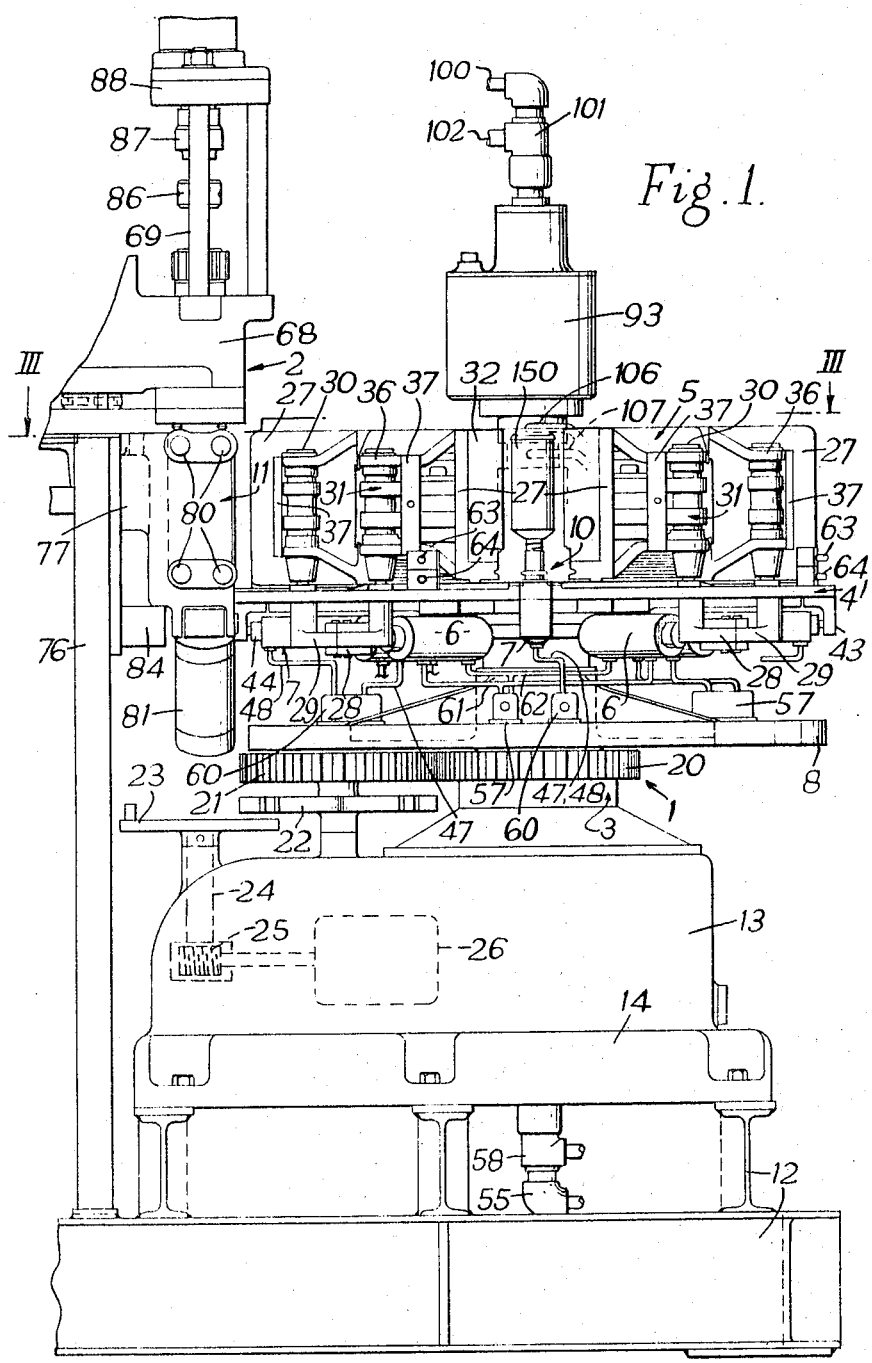

The machine illustrated basically comprises a blow-moulding structure, generally designated 1, and an associated injection-moulding assembly generally indicated 2. The blow moulding structure is of the turret type, in that it comprises a main upstanding rotary column 3 which is adapted to be rotated carrying with it a circular platen or table 4 supporting some four blow moulding sets 5 regularly spaced there around. Attached to the underside of this table are air cylinders 6 and 7, respectively for opening and closing the blow moulding sets and for moving parison transfer carriers 10 (to be described later). Below the table 4 the column 3 carries a sub-platen 8 on which are mounted electromagnetic air valves 9 controlling the supply of air to the cylinders 6 and 7.

The carriers 10 have upstanding mandrels (two in the case illustrated) and each carrier is slidable radially on the table 4 to carry the mandrels from the zone of the corresponding blow moulding set 5 to a position in which they are projected beyond the edge of the table 4, and in the zone of an injection moulding die set 11 beneath the head of the injection moulding assembly 2. The slide is then reversible to bring the mandrels, carrying parisons thereon, back on to the table and into the effective zone of the parent blow moulding set.

The various assemblies will now be described in more detail below.

*The turret column and its mounting and driving means*

Figure 2:
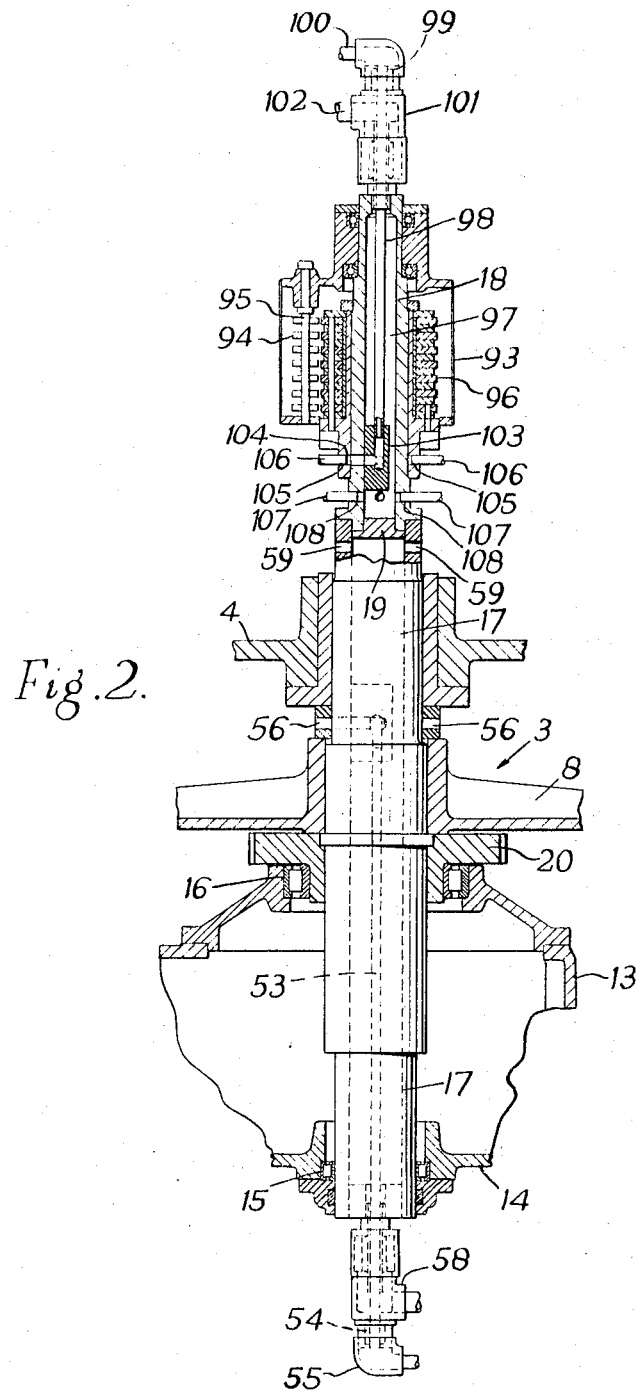

In the first place the column is mounted on a base 12 made up of crossed girders and supporting a motor casing 13 having a base section 14. Rotatably mounted in bearing races 15 and 16 at the bottom and top respectively of the casing 13 is a central main hollow shaft 17 of the turret structure, this upstanding from the casing and having the sub-platen 8 and the table 4 secured thereto at appropriate levels (see FIGURE 2). At its upper end the shaft 17 carries a co-axial hollow extension 18 which is blanked off from the interior of shaft 17 by a plug 19.

Also secured to shaft 17 below the sub-platen 8 is a gear wheel 20 meshing with a corresponding wheel 21 which is rotatable stepwise by an indexing mechanism, to produce intermittent rotation of the shaft, the table and the assembly carried thereby, the platen 8 and its assembly, and the shaft extension 18 and its equipment. This indexing mechanism can take various forms, and in the example shown in the drawings is illustrated as comprising a Geneva wheel 22 mounted on the shaft of wheel 21, and co-operating pin-provided driving disc 23 rotatable on a shaft 24 which descends into the casing 13 and is drivingly coupled by gearing, generally designated 25, to an electric motor 26 in this casing.

*The table and the blow moulding sets*

Figure 3:
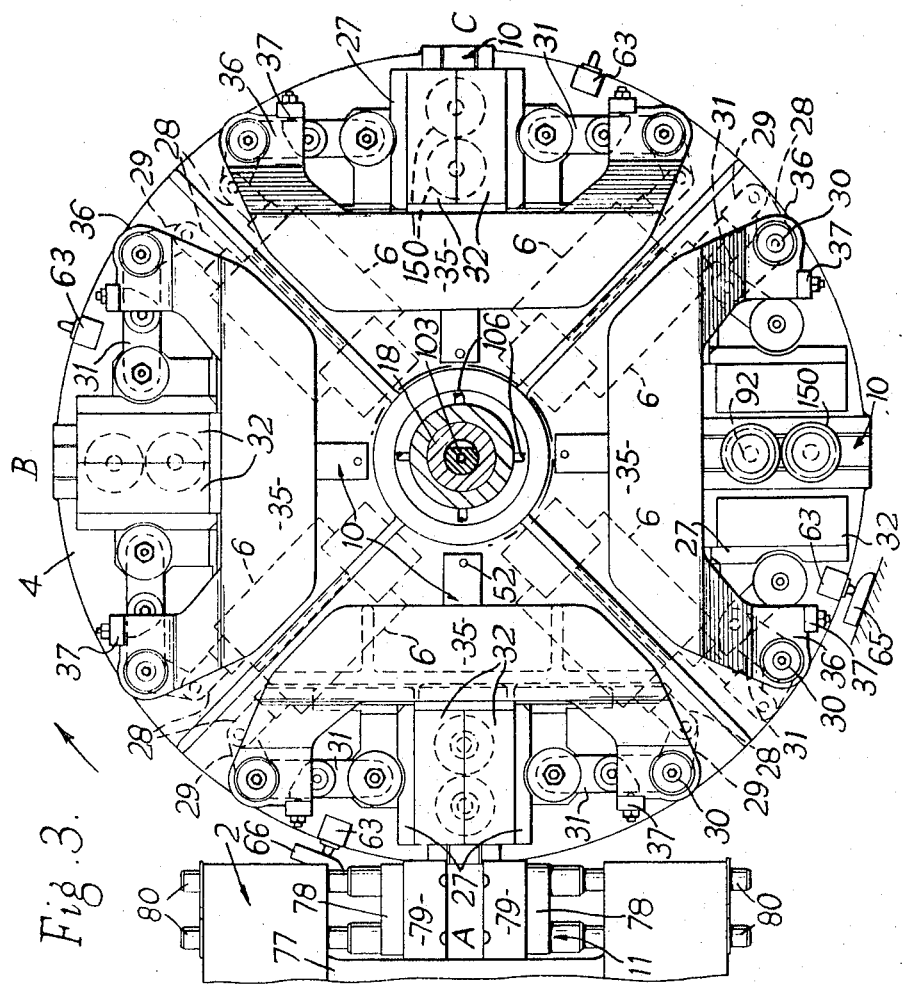

As indicated above the table 4 carries four blow moulding sets, and these are arranged at a regular angular spacing around the table. The table is arranged to be indexed 90° at each step, thus to move each blow moulding set in turn into, and arrest it in, each of the four stations A, B, C and D (see FIGURE 3). Station A is that adjacent the injection assembly 2, and that at which parisons are injection moulded and transferred to the blowing structure, stations B and C are closed-blowing-mould dwell and cooling stations, and station D represents the ejection zone where the ultimate mouldings are expelled.

Each mould set comprises a pair of die plates 27 which are closable together and movable apart by corresponding air cylinders 6 disposed at 90° to one another beneath the table. The forked extension 28 of the piston of each cylinder, through a link 29, operates a spindle 30 which is coupled to the corresponding die plate 27 through a toggle linkage 31. When the piston 28 is in its fully-retracted position, the linkage 31 is straightened to close the mould set concerned, as for example is illustrated in the case of the left hand moulding set 5 in FIGURE 2. When the piston in a cylinder 6 is projected, as in the case of the two lowermost cylinders seen in FIGURE 3, the linkage 31 is broken and the mould set opened.

In use, the die plates 27 of a mould set are equipped with appropriate, removable mould blocks 32, which, in the case illustrated, are assumed to be designed for the moulding of a pair of bottles 150, and means (not shown) may be provided for adjusting the throw of the toggle linkage to suit it to moulds of different thicknesses.

The die plates are at all times disposed with their lengths parallel to the parting line of the moulding set, and are movable at right angles to this parting line, i.e. to the radius of the table at this part; to guide them in this movement they are each equipped at their inner sides with a rib 33 of dovetail section which moves in a corresponding groove in a corresponding guide bracket 34 bolted to the table 5.

Each bracket 34 is cast with a foot 38 by which it is secured to the table 4, and with an upper canopy 35 having at each end a downturned wing 36 extending to the periphery of the table and serving as a support for the upper ends of the respective spindle 30. These wings also have vertical strips 37 bolted thereto at their extremities to serve as stops determining the maximum straightening of the corresponding toggle unit 31.

*The mandrel carriers*

Each mandrel carrier 10 has an elongated rectangular body 39 which is slidable in a guideway 46 arranged with its length disposed radially of the table 4 and its axis coincident with the parting line between the mould parts 32. The body 39 provided with a longitudinal duct 40 and, at its leading end, with recesses receiving plugs 41 each intended for the mounting of a parison mandrel 92, examples of which will be described below. This mandrel is to serve as a core for receiving a parison in the injection assembly 2 and to convey this eventually to a blow moulding set 5 on the table 4, and then to become a blowing mandrel for expansion of the parison in the blow mould.

Each of the plugs 41 is bored with central and transverse ducts communicating with the duct 40 and is mounted in the block 10 with the interposition of resilient rings 42 which allow for slight canting adjustment of the plug, and hence of the mandrel carried thereby, to compensate for any mould misalignment during the operation, either in the injection moulding zone or in the blow moulding zone.

At its outer end the carriage body 39 is furnished with a downturned bracket 43 into which is screwed one end of a pin carried by the piston 44 of the corresponding air cylinder 7 for operating this carriage. At its rear or inner end this cylinder 7 is pivoted on a bracket 45 on the table 4.

Air pressure applied to one end and the other of the cylinder 7, i.e. through lines 47 and 48, will respectively cause the carriage 10 to be projected to its outer position (i.e. to take mandrels to the injection moulding zone) and to its inner position (to bring the mandrels into the blow moulding zone), and in the second of these positions a seal 49 at the rear end of this carriage abuts against a nozzle 50 which is mounted on a piece 51 attached to the bracket 38 and incorporates a blowing air line 52. Thus, in the retracted position of the mandrel carrier, air is made available to the mandrels through the line 52 and the duct 40.

Air supply and controls

Air is supplied for operating the cylinders 6 and 7 at a higher pressure than that used for blowing, and for this purpose, therefore, the air is taken, in effect, from two different sources. In the present machine, these respective air supplies are conveniently brought to the working points by a compact, concentric conduit system in the turret structure itself. Thus, referring particularly to FIGURE 2, it will be observed that there is a pipe 53 running through the centre of the shaft 17, this turning with the latter but being journalled at its lower end in a sealed bearing 54 in a fixed union 55 which is piped to a high pressure source of compressed air for operating the cylinders 6 and 7. At its upper end this pipe is connected to four outlets 56 coupled by piping to the air valves 57 on the sub-platen 8 (see below).

A further fixed union 58 surrounds the pipe 53 below the base section 14 and is connected to the source of lower pressure blowing air. This union communicates with the interior of the shaft 17 around pipe 53, and it will be noted that this shaft is provided, just below plug 19, with outlets 59 for the egress of this blowing air. There are four outlets 59 and each is connetced by a pipe to an electromagnetic air valve 60 on the sub-platen 8. Each valve 60 is used to control the flow of blowing air to the corresponding duct 52 and to the corresponding mandrel carrier 39.

Thus, there is one air valve 57 controlling the air to each corresponding pair of mould operating cylinders 6, and an associated valve 60 controlling the air to the two ends of the carrier cylinder 7 associated with this particular mould set, and these two valves are arranged side by side in a more or less radial position on the sub-platen 8. In the case of each valve 57, a tapping 61 is branched to the corresponding ends of the two cylinders 6 concerned, and similarly a tapping 62 is branched to the other ends of these two cylinders. In the case of the valve 60, the connection is through the lines 47 and 48 already referred to.

All the valves 57 and 60 are of an electromagnetic, shuttle type with a solenoid which is operable by switch means to allow air to pass therethrough from the respective supply. The switch means in the two cases has been diagrammatically indicated in FIGURES 1 and 3 of the drawings, from which it will be noted that a pair of microswitches 63 and 64 are shown at the right hand side of the table 4. In fact, there is a bank of two such switches at a location associated with each blow moulding zone of the table. Of this bank, the upper switch 63 is arranged for co-operation with a fixed cam 65 at the table station D, and as a result of the operation of each successive switch 63 by this cam, the solenoid of the corresponding valve 57 is energised to reverse the air in the cylinder 6 of the mould halves concerned, thereby to open these for the ejection.

A further fixed cam 66 associated with the injector assembly at station A is of a depth and positioned so as to operate both the oncoming switch 63 and the associated switch 64 (at a lower level), when the mould assembly concerned reaches this station A. The respective results of this are to re-open the blow moulding set and then to send air through the corresponding valve 60 and cause the mandrel carriage to be projected into the injection moulding zone. The ensuing injection moulding of the parisons and the retraction of this carriage, taking the parisons with it, are explained below.

On return of the carrier to its retracted position, closure of the relevant blow moulding set is triggered by the engagement of a rear edge of the bracket 43 with a switch 67 which is arranged beneath the table and is thereby adapted to control the corresponding electromagnetic shuttle valve 57.

Injection-moulding assembly

The assembly 2 arranged at the station A comprises an injection head which may be of any suitable conventional type, although one with a high rate of stroke is preferred. This assembly has therefore merely been diagrammatically indicated. In the example illustrated it is shown as comprising a head 68 defining an injection chamber 70, has an injector plunger 69 reciprocable therein and has a feed channel 71 for plasticised material opening into it.

At its lower end the injector head is provided with a closure plate 73 in which are formed three injector nozzles 72. The nozzles can be selectively chosen to perform an injection, depending on the form of the cooperating moulds, and those to be used are fitted with double headed valve elements 74, whilst the unused nozzles are blanked off as at 75 (see FIGURE 4).

Secured on the frame 76 of the injector system below the head 2 is a mounting 77 for the injection moulding die set 11. This die set, in fact, comprises a pair of die plates 78 removably carrying appropriate mould blocks 79 and having sleeves slidable on pairs of guide rods 80 supported by side blocks of the mounting 77.

Pivoted to the underside of the mounting 77 are a pair of air cylinders 81, the piston rod 82 of each of which is articulated to a toggle mechanism 83 pivotally connected at its ends to the mounting 77 and to one of the die pates 78. The ends of each of these cylinders 81 are connected through a solenoid-operated shuttle valve, seen at 84 in FIGURE 1, to a source of compressed air, preferably the source supplying the cylinders 6 on the blow moulding table.

It is arranged that each slide 10 shall, at the end of its outward stroke, operate a switch 85 carried by the injection moulding assembly (see FIGURE 4) to trigger the valve 84 and so cause the admission of air to the appropriate end of cylinders 81 and closure of the die set 78. The reversal of the valve 84 to open the set is initiated by a switch (not shown), which is operated by the injector plunger 69 when the latter reaches the end of its downward stroke. It will be noted from FIGURE 1 that an adjustable nut 86 on the plunger 69 determines the end of this stroke and that the length of the stroke is set by lock nuts 87 on plunger 69 co-operating with the frame 88 of the assembly.

As has been indicated, each mandrel carrier 10, in the instance shown, is equipped with plugs 41 for mounting three side-by-side mandrels. Where only two mouldings, say, are required to be produced at a time, as in the case chosen for illustration, cavities 91 in the injection or parison mould blocks 79 will be shaped accordingly. Again, the actual length and size of the cavities will depend on the intended size and thickness of the ultimate blown mouldings. It will also be noted that provision is made for cooling the injection moulds at the part corresponding to the lower end of the mandrels, through passages 89, and that it is preferably also equipped with electrical heaters 90 around the upper parts of the walls of the moulding cavities 91.

Upper turret rotary equipment

At its upper end the column extension 18 is used to carry means for supplying current for operating the various switching and electromagnet valve mechanisms which have been described above. For this purpose the extension is provided with a stationary housing 93 which carries a series of current-supplied brushes 94 on a spindle 95, these brushes being arranged to co-operate with slip rings 96 arranged collar-fashion around the rotatable extension and connected to the units to be supplied.

As previously indicated, the extension 18 is hollow with a longitudinal bore 97, and passing through this bore is an inner pipe 98. This pipe is destined for the delivery of cooling water to the blow moulding sets and is journalled at its upper end in a fixed union 99 leading to a source of such water through a pipe 100. The lower end of the pipe 98 enters a block 103 which is ducted into an annular chamber 104 communicating with some four water outlets 105 which are connected through piping 106 to the mould sets. A second fixed union 101, piped at 102 to waste, communicates with the longitudinal bore 97 in the shaft extension, and the return of water from these moulds is through piping 107 to inlet ports 108 provided around the lower end of shaft extension 18 and communicating with bore 97.

*Operation*

As a starting point for summarising the automatic sequence of operations, which have already been partially described, we refer to a blow moulding set 27, 32 which stands open at station D and from which mouldings 150 have just been ejected by blowing air sent through the mandrels 92 on the carriage 10 concerned.

The table 8 is indexed through 90° by the indexing mechanism 20–26 and, as the switch 83 leaves the cam 65, this blow moulding set is closed. On reaching station A, as explained above, the cam 66 operates both switches 63 and 64 associated with the blow moulding set. In the first place operation of switch 63 causes the solenoid of the corresponding electromagnetic valve 57 to be energised, so reversing the flow of compressed air to the corresponding cylinders 6 and opening the set. The result of the concomitant closure of switch 64 is to energize the solenoid of the corresponding valve 60, through a timer (not shown), thereby to reverse the air flow to the corresponding cylinder 7, and cause the slide 10 to be projected radially out from between the mould halves 27, 32 and to be received in the open injector die set 78, 79.

On reaching its outermost position, the slide 10 operates switch 85 and thereby reverses valve 84 and the air flow in the cylinders 81, so causing the die set 11 to be closed. The closure of this set is arranged, through a switch (not shown) to initiate the injection moulding stroke, and the travel of the injector plunger 69, as explained above, to operate valve 84, so as to reverse the air flow in cylinders 81 and so re-open die set 11.

In turn this re-opening causes reversal of the relevant electromagnetic valve 60 and retraction of the carriage 10 back between the blow moulds and operation of the corresponding switch 67. This triggers the closure of the blow muolds and, through a timer-controlled valve (not shown) the opening of the blowing air passage.

The table moves on under the impetus of the indexing mechanism, and the cycle is repeated for the next-following blow moulding set. In the meantime, the first-mentioned blow-moulding set remains closed (with continued internal blowing and consequent cooling), until it eventually arrives at station D. On its arrival here, cam 65 causes the mould set to be opened and, the air supply through mandrels 92 being continued, the finished mouldings are blown off.

*Blow mandrels*

As indicated above, the present invention also includes an improved form of blowing mandrel, and variant examples of these are shown in FIGURES 7 and 8 of the accompanying drawings.

In the case of that illustrated in FIGURE 7, the mandrel 92 comprises a hollow boss 109 which is threaded at its reduced lower end 120 for screwing into the corresponding plug 41 on mandrel carrier 10. The boss receives the lower end of a mandrel body 111 with an upstanding cylindrical stem 112. This stem 112 has an upper portion 113 of reduced diameter, and around this is slidably disposed a close-fitting sleeve 114 of which the external surface is flush with that of the lower part of the stem.

The body 111, its stem 112 and extension 113 are provided with a common internal bore 115 in which is disposed, with a small all-around clearance, a rod 116 which is screwed, at its upper end, into a closure cap 117. At its lower end the rod 116 has screwed thereon a piston-forming washer 118 which is movable in a chamber 119 of stepped diameter formed within the boss 109. This chamber communicates through a conduit 110 with the ducting in the receiving plug 41 and with the conduit 40 of the mandrel slide, i.e., with the eventual source of blowing air. The piston 118 is normally urged downwards into its lower position by a spring 122 thereby to apply the cap 117 against the upper end of sleeve 114.

The body 111 is also formed with a longitudinal channel which receives, with a close but sliding fit, a thrust rod 121 extending between the piston 118 and the junction 123 between this body and the lower edge of sleeve 114. In addition the body 111 has a second longitudinal bore 124 which opens at one end into chamber 119 and extends to the upper end of the full section 112 of the stem. A transverse conduit 125 is branched from this bore 124 and opens at the outer face of the larger diameter of the body 111.

Figure 4:
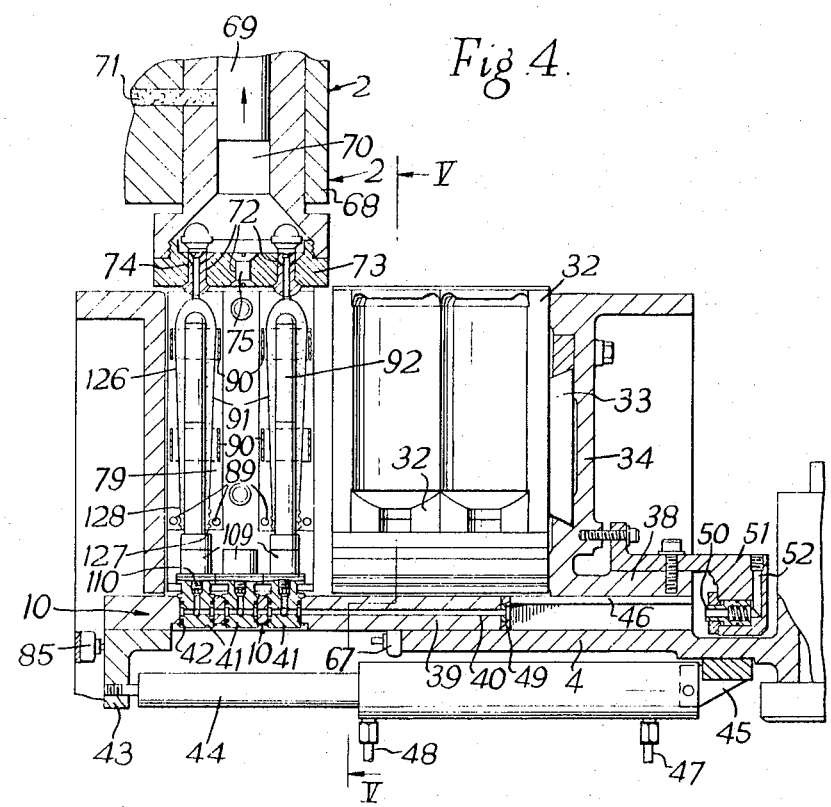
Figure 5:
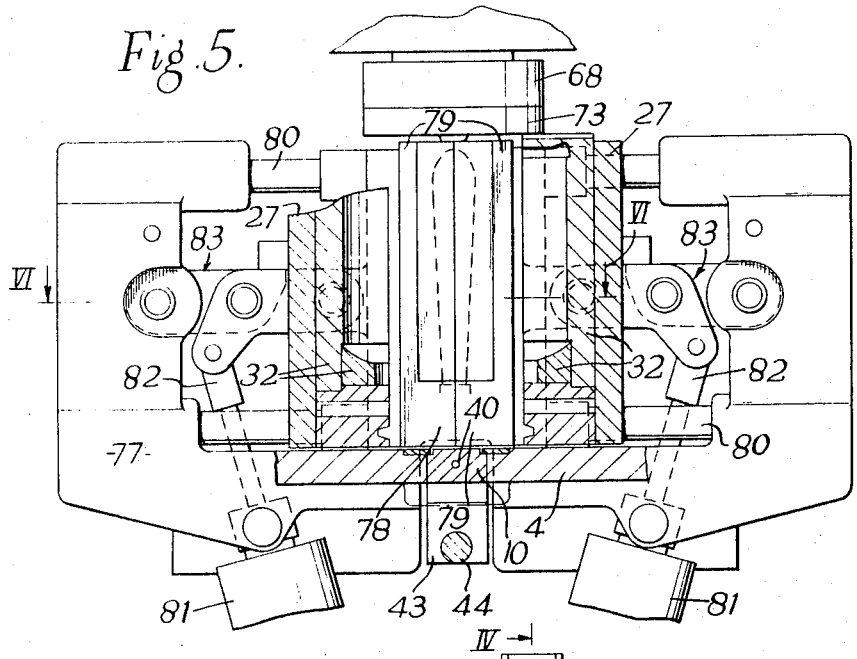
Figure 6:
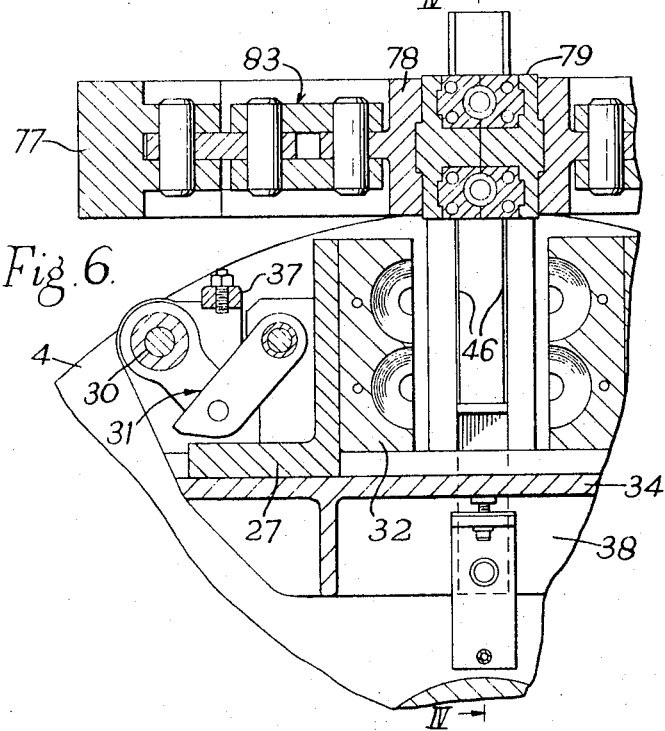
FIGURE 6 is a partial horizontal section on the line VI—VI of FIGURE 5.

In use, a thermoplastic pre-form or parison is injection moulded around a core formed by the stem 112 of mandrel 92, as indicated by the parison 126 in FIGURE 4, and its lower end terminates immediately above the external shoulder 127 of the body 111.

As has been indicated above, a great virtue in the preliminary injection of a parison in this way is that a delicate part of the intended moulding can be finished formed within critical tolerances at this stage, and not expanded or deformed in the subsequent blowing phase of the operation. In the case of the mandrel being described, this can readily be seen in the formation of a screw thread 128 at the neck of a bottle 150 of which the remainder will be finally shaped in the blowing phase. The conservation of the form of the screw thread, produced in the required size and shape in the parison at the injection phase, in this invention is greatly assisted by differential cooling of the parts of the parison during the injection and blowing stages.

At the injection stage this effect is obtained by circulating cooling water through the channels 89 in the injection die set in the vicinity of the part at which the screw thread 128 is formed. During the blowing phase the differential effect is assisted not only by the provision of a flow of coolant through the blow moulding sets, but also by virtue of the circulation of the blowing air (which has a cooling action) through the mandrel in the vicinity of the thread, which is provided for in the particular mandrel construction described above.

Thus, when a mandrel or transfer carrier slide 10 is retracted to its inner position on the blowing table, the associated blow moulding set closed around the mandrels, and the blowing air admitted to the conduit 110 of each mandrel, this air lifts the piston 118 and thereby parts the cap 117 from the sleeve 114 to produce a gap between them at 129.

When the piston 118 has cleared the narrower section of the chamber 119, the blowing air flows round it and up through the bore 115 along the annular clearance around the rod 116 and out through the gap at 129 (as indicated by arrows E and F in FIGURE 7) to bring about the expansion of the pre-form in the closed blow moulding set concerned.

In the course of its upward movement, the piston, shortly after the cap 117 has begun to open, contacts and lifts the thrust rod 121 thereby to lift the sleeve 114 and open a gap at the junction 123. This permits the return of blowing air from around the mandrel through the gap 123 (as indicated by arrows G) and thence down the bore 124 to be exhausted to atmosphere through the conduit 125. In other words, the returning air is circulated through the interior of the lower part of the mandrel stem at the part of the latter contacted by the injection moulded screw thread on the moulding, thereby cooling the latter, which is confined within restricted limits in the blowing mould. By virtue of this cooling of the threaded portion of the blank at both stages of the operation, it is possible to form and maintain a screw thread within critical limits and this means that, when the bottle is finally ejected, no finishing or reaming is necessary and there are no faulty thread or pitch tolerances. Furthermore the means described allow for the correct production of any differential thickness between the body and the neck of the bottle.

It is to be noted that a needle valve (not shown) is associated with the conduit 125 and is settable to adjust the blowing pressure, and that, if required, a vacuum could be applied to the blowing mould to assist the application of the blown blank to the walls of the latter.

A modified version of the mandrel of FIGURE 7 is seen in FIGURE 8 in which like parts have been accorded the same reference characters. It differs from the first-described mandrel essentially in the fact that arrangements are made for the distribution of the emergent blowing air at a number of places along the length of the sleeve 114, thereby to provide for uniform application of blowing air against the parison. It will be observed that the sleeve 114 of FIGURE 7 is here replaced by a stepped series of relatively movable abutting sleeve sections 130 which can be opened apart at their junctions 131 for exit of the blowing air. Again the latter is derived from the annular clearance 115 around the rod 116, but it will be noted that this clearance now communicates with a series of radial ducts 132 which open against conically tapered recesses 133 in the sleeve sections 130 at the junctions 131. By virtue of this formation the pressure of the blowing air is able to force the gap open for emission of the air.

Here again the return of the air is through the gap at 123, and through the conduit 124 to atmosphere.

The machine described is entirely automatic and capable of a very high rate of output of accurately finished mouldings requiring no trimming or other treatment.

We claim:

1. A machine for moulding hollow bodies, comprising a rotatable support, blow moulding sets mounted on said support at successive rotational positions thereof, each said set comprising at least two relatively separable parts, a mandrel carrier associated with each said set and movable on said support, a stationary injection moulding assembly adjacent said rotatable support, and means for moving each said mandrel carrier radially outwards from the associated blow moulding set to the injection moulding assembly for injection of a pre-form, and inwards again for blowing of said pre-form in the blow moulding set.

2. A machine for moulding hollow bodies, comprising a unidirectionally rotatable structure supporting blow-moulding means, a stationary injection die moulding assembly positioned adjacent said structure, and carrier means for transferring a blowing mandrel, carrying a parison, from said injection moulding assembly radially of the axis of rotation of said rotatable structure into the moulding means on said rotatable structure for blowing to shape in, and for travel with, said last mentioned moulding means.

3. A machine for moulding hollow bodies, comprising a rotatable support including an upright column carrying a blow moulding table, blow moulding sets disposed in a ring around said table, a mandrel carrier radially slidable on said table in the zone of each said blow-moulding set, a stationary injection moulding assembly adjacent said rotatable support, means for rotating said table intermittently to bring each mandrel carrier in turn opposite said injection moulding assembly, and means for displacing each carrier, on arrival at the injection moulding assembly, radially to project it from the table and into said assembly, and to retract it into the confines of the table after injection.

4. A machine according to claim 3, in which the mandrel carrier has means for mounting at least one mandrel thereon and is ducted for the flow of blowing air therethrough to said mandrel from the inner end of the carrier.

5. A machine according to claim 3, in which each blow moulding set comprises a pair of mould halves, and gunde means for guiding the separation and closing together on said mould halves in a path at right angles to the path of reciprocable travel of the associated mandrel carrier.

6. A machine according to claim 3, in which said column is provided with internal conduits for the conveyance of coolant to said blow moulding sets.

7. A machine for moulding hollow bodies, comprising a rotatable support including an upright column carrying a blow moulding table, blow moulding sets disposed in a ring around said table, each said set comprising at least two relatively separable parts, air cylinders mounted on said table and operatively connected to said blow mould parts, said upright column being formed to provide air channels to said air cylinders, a mandrel carrier radially slidable on said table in the zone of each said blow-moulding set, a fixed injection moulding assembly adjacent said rotatable support, and means for moving each said mandrel carrier radially of said support so as to project into said injection moulding assembly.

8. A machine for moulding hollow bodies, comprising a rotatable support including an upright column carrying a blow moulding table, blow moulding sets disposed in a ring around said table, each said set comprising at least two relatively separable parts, air cylinders mounted on said table and operatively connected to said blow mould parts, a mandrel carrier radially slidable on said table in the zone of each said blow-moulding set, a fixed injection moulding assembly adjacent said rotatable support, and air cylinders mounted on said table and operatively connected to said mandrel carriers for projecting the same from the table into said assembly, said upright column being hollow for the passage of operating air to the air cylinders of the blow mould parts and mandrel carriers.

9. A machine according to claim 8, in which the rotatable support further includes a platen-carrying-valve means to control the flow of operating air to said air cylinders.

10. A machine for moulding hollow bodies, comprising a rotatable support including an upright column carrying a blow moulding table, blow moulding sets disposed in a ring around said table, each said set comprising at least two relatively separable parts, air cylinders mounted on said table and operatively connected to said blow mould parts, a mandrel carrier radially slidable on said table in the zone of each said blow-moulding set, each said mandrel carrier having provision for the selective mounting thereon of at least one blowing mandrel, and being ducted for the flow of blowing air to said mandrel from its upper end, a fixed injection moulding assembly adjacent said rotatable support, and air cylinders mounted on said table and operatively connected to said mandrel carriers for projecting the same from the table into said assembly, said upright column being hollow and formed with conduits for the flow of operating air to the various air cylinders and to the mandrel carriers.

11. In a plastics moulding machine a transportable blowing mandrel comprising a hollow stem to receive a plastic parison, said stem including longitudinally separable sections and having at least one gas discharge conduit therein, means to connect the hollow interior of said stem to a source of compressed gas, and means carried by said stem responsive to gas pressure applied to said hollow interior to part said separable sections and form at least a first gap for expulsion of said gas to the exterior of the stem, and a second gap for return flow of the expelled gas to said discharge conduit.

12. In a plastics moulding machine comprising an injection assembly, a blow moulding assembly, and means for conveying at least one blowing mandrel from said injector assembly to the blow moulding assembly, a hollow stem having longitudinally separable outer sections and at least one gas discharge conduit therein separate from the hollow interior of the stem and communicating with a parting joint between two of said separable sections, a section-clamping cap mounted at one end of said stem, a rod passing through the hollow interior of the stem and connected at one end to said cap and carrying a piston at the other, and a thrust rod between said piston and one of said sections, whereby the piston is adapted, in response to the application of blowing gas to said hollow interior, firstly to move said cap out of its clamping position to allow said gas to open at least one gap between the separable sections and emerge from this gap, and secondly to actuate said thrust rod to open a second gap between said sections for return of gas to said discharge conduit.

References Cited by the Examiner

UNITED STATES PATENTS

| | | | |
|---|---|---|---|
| 2,789,312 | 4/1957 | Borer | 18—5 |
| 2,792,593 | 5/1957 | Hardgrove | 18—5 X |
| 2,914,801 | 12/1959 | Colombo | 18—5 |
| 2,928,120 | 3/1960 | Leghorn et al. | 18—5 |
| 2,930,079 | 3/1960 | Parfrey | 18—5 |
| 3,011,216 | 12/1961 | Gussoni. | |

FOREIGN PATENTS 568,485    6/1958    Belgium.

J. SPENCER OVERHOLSER, *Primary Examiner.*

WILLIAM J. STEPHENSON, MICHAEL V. BRINDISI,
*Examiners.*

L. D. RUTLEDGE, H. E. MINCHEW, W. L. McBAY,
*Assistant Examiners.*